United States Patent

[11] 3,633,433

[72] Inventor Eugen Schurch
 Gerlafingen, Switzerland
[21] Appl. No. 40,194
[22] Filed May 25, 1970
[45] Patented Jan. 11, 1972
[73] Assignee Von Roll AG
 Gerlafinger, Switzerland
[32] Priority May 28, 1969
[33] Switzerland
[31] 8083/69

[54] GEAR RACK FOR A TRACK OF SUSPENDED OR OVERHEAD CONVEYORS
 6 Claims, 7 Drawing Figs.
[52] U.S. Cl. .................................. 74/415,
 74/422, 74/462
[51] Int. Cl. ..................................... F16h 1/06,
 F16h 1/04, F16h 55/06
[50] Field of Search ............................ 74/415,
 462, 460, 422

[56] References Cited
UNITED STATES PATENTS

| | | | |
|---|---|---|---|
| 2,974,534 | 3/1961 | Clickner | 74/457 X |
| 574,195 | 12/1896 | Cottrell | 74/460 |
| 3,490,306 | 1/1970 | Hansgen et al. | 74/415 X |
| 2,141,627 | 12/1938 | Street | 74/462 X |
| 2,963,103 | 12/1960 | Wood, Jr. et al. | 74/415 X |
| 3,184,988 | 5/1965 | Osplack et al. | 74/462 X |

Primary Examiner—Leonard H. Gerin
Attorney—Werner W. Kleeman

ABSTRACT: A gear rack arrangement for the track of an overhead conveyor system in which the movement of the transport unit is undertaken through the agency of a gear rack and pinion drive. The drive pinion of the transport unit meshes with the gear rack arranged at the track. According to an important aspect of the invention, the teeth of the gear rack are designed such that their thickness radially reduces inwardly and outwardly at the track curves, the plane of which is situated parallel to the plane of the gear rack.

PATENTED JAN 11 1972  3,633,433
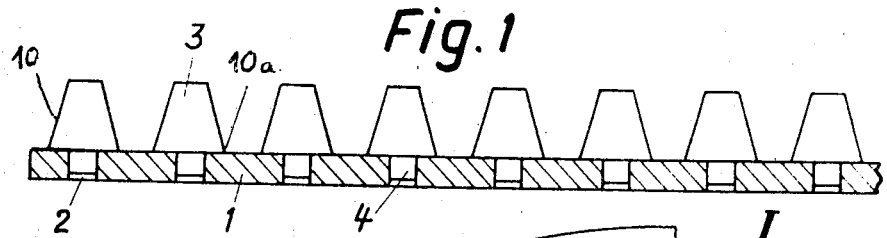
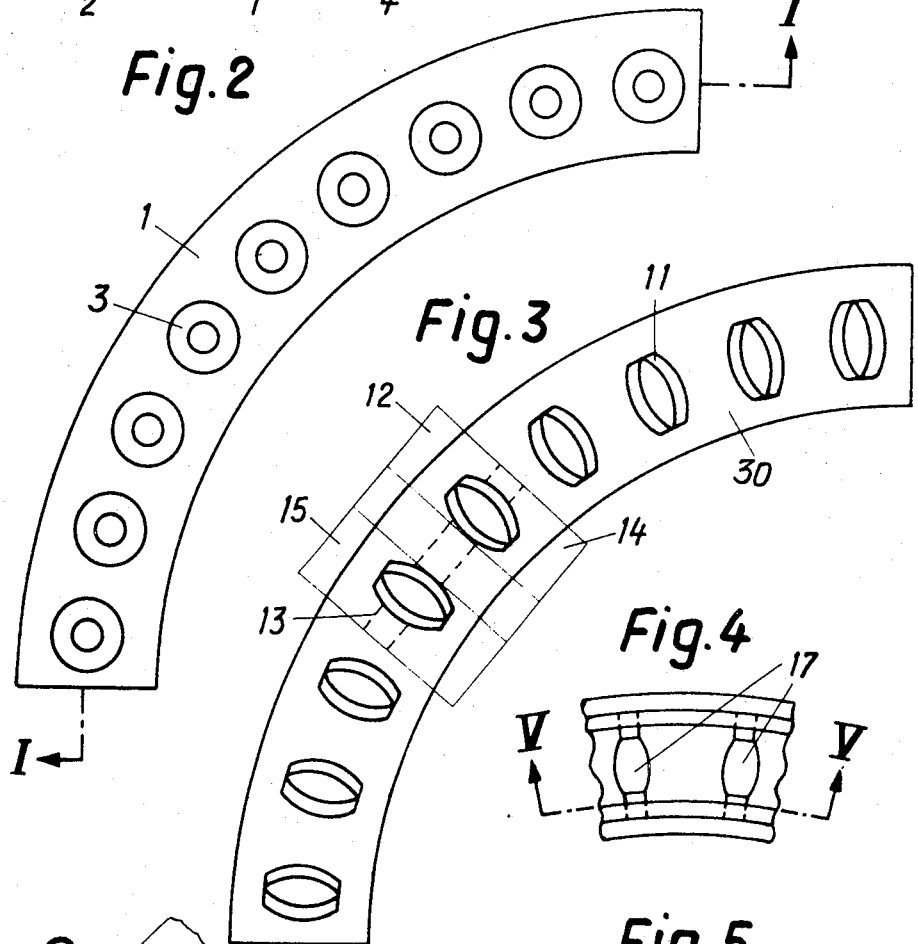
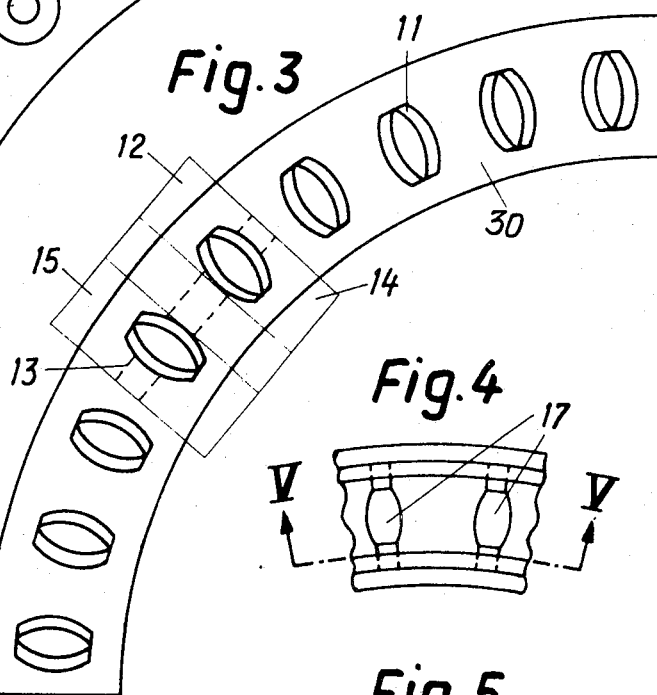
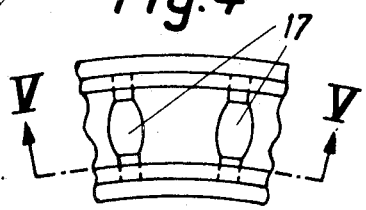
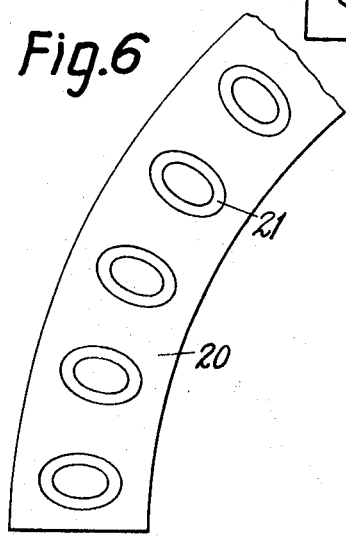
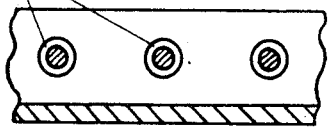
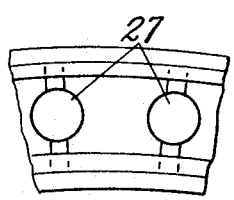
INVENTOR
EUGEN SCHURON
BY Kleiner H. Kleeman
ATTORNEY 3,633,433

GEAR RACK FOR A TRACK OF SUSPENDED OR OVERHEAD CONVEYORS

BACKGROUND OF THE INVENTION

The present invention relates to an improved gear rack for a track of overhead or suspended conveyor systems in which the movement of the transport or conveying units occurs through the agency of a rack and pinion drive, the drive pinion of the transport or conveying unit meshing with the gear rack of the track.

Overhead or suspended conveyor systems are already known to the art wherein the individual conveying or transport units with their travelling rollers run upon the travel path of the track, whereas for instance a gear rack is arranged at the underside of the track also laterally thereto and with which the drive pinion of the drive arrangement for the transport unit meshes. Such rack and pinion drive can be used both with horizontally as well as vertically disposed track rails and furthermore also with vertically arranged curves where the tooth profile can be accommodated to the convex or concave configuration of the track rail.

A major drawback of the known overhead conveyor system resides in the fact that up to now it was not possible to equip horizontal curves with a gear rack. This was because teeth meshing conditions existed between the gear rack and the pinion which no longer ensured for a clean rolling off of the teeth. The rack had to essentially possess a bevel gearlike appearance, whereas the pinion remained unchanged, so that its parallel teeth were unable to cleanly and positively mesh with the bevel gearlike rack.

SUMMARY OF THE INVENTION

Therefore, there is a real need in the art for an improved gear rack for the tracks of overhead conveyor systems which does not exhibit the aforementioned disadvantages associated with the prior art constructions. A primary objective of this invention is to thus provide such improved gear rack arrangement which effectively fulfills this need.

Another, more specific object of the present invention relates to an improved gear rack arrangement for the track of overhead or suspended conveying systems wherein the rack and pinion drive provided for the movement of the conveying or transport units permits an engagement between the drive pinion and the rack which is devoid of binding or constraint and nonetheless enables the use of a drive pinion possessing parallel teeth.

Now, in order to implement these and still further objects of the invention, which will become more readily apparent as the description proceeds, the gear rack arrangement of the present invention is generally manifested by the features that the teeth of the gear rack reduce in their thickness radially inwardly and outwardly at the track curves the plane of which is disposed substantially parallel to the gear rack plane. Under the expression "the plane of the track curve" there is to be understood that plane in which the curve is situated and which, for instance, can be a vertical or horizontal plane. The gear rack plane is, for instance, the plane in which there is located the root of the teeth for standard gear teeth or for a pin gearing the plane where there are located the radial axes of the teeth of the rack.

The teeth can be advantageously constructed as truncated cones, the axes of which extend perpendicular to the plane of the curve, and wherein the truncated cones are constructed to possess a substantially circular cross-sectional configuration. Furthermore, the truncated cones can possess a cross section of elipticallike configuration with the major axis extending radially with respect to the center of the track curve.

In the event that, for instance a pin gearing is provided for the gear rack arrangement which is used, then the teeth of the gear rack can be substantially barrel shaped with radially directed axes extending substantially parallel to the plane of the track curve, or such pins can also possess substantially ball or spherical configuration.

BRIEF DESCRIPTION OF THE DRAWING

The invention will be better understood and objects other than those set forth above will become apparent when consideration is given to the following detailed description thereof. Such description makes reference to the annexed drawings wherein:

FIG. 1 is a schematic side view, partially in section, taken substantially along the line I—I of FIG. 2, of a first embodiment of gear rack used for horizontal curves;

FIG. 2 is a top plan view of the gear rack depicted in FIG. 1;

FIG. 3 is a top plan view of a further embodiment of gear rack employed for horizontal curves;

FIG. 4 is a fragmentary top plan view of a gear rack employing pin gearing;

FIG. 5 is a cross-sectional view of the pin gearing gear rack of FIG. 4, taken substantially along the line V—V thereof.

FIG. 6 is a fragmentary schematic top plan view of a gear rack, somewhat similar to the showing of FIG. 3, and illustrating more clearly the elipticallike cross-sectional configuration of the substantially truncated cone teeth thereof; and FIG. 7 is a fragmentary top plan view of a gear rack employing pin gearing, substantially similar to the showing of FIG. 4, and illustrating the substantially spherical configuration of the teeth thereof.

DETAILED DESCRIPTION OF THE PREFERRED EMBODIMENTS

Describing now the drawings, in FIGS. 1 and 2 there is illustrated a gear rack arrangement designed according to the teachings of the present invention which consists of a curved tooth support girder or member 1 formed of steel or some other suitable material, possessing in cross section a substantially flat rectangular profile. A number of bores or apertures 2 are provided at the rack teeth support 1 which are spaced from one another at a distance corresponding to the division or spacing of the teeth of the gear rack-pinion-drive arrangement. The teeth 10 of the curved gear rack support member 1, which teeth possess the configuration of a truncated cone 3, are mounted by means of their associated cylindrical pins 4 in these bores 2. Now, in the embodiment shown the base track rail defined by the teeth support girder 1 and also the root 10a of each of the teeth 10 are disposed parallel to the previously mentioned and defined plane of the track curve. Attachment of the truncated cones 3, which in the exemplary case under consideration possess a substantially circular conelike configuration, can be undertaken in any number of different ways, for instance by providing a press fit, by welding at the rear face or by an adhesive bond, or the like. The truncated cones 3 and the base rail or support 1 can also be formed from one and the same piece, in other words as an integral unit. Further, in side view the truncated cones 3 possess the same tooth profile as the gear rack at the straight or linear portions of the track rail.

Now in the arrangement of gear rack depicted in FIG. 3 the tooth support girder or member 30 is equipped with gear teeth 11 which likewise possess the shape of truncated cones, but in their cross-sectional configuration as viewed in cross-sectional surfaces taken parallel to the plane of the track curve here they are not circular as was the case with the teeth 10 of FIGS. 1 and 2, rather possess a substantially elipticallike cross-sectional configuration, wherein the major axis extends radially with respect to the center of the track curve. FIG. 6 similarly shows an arrangement of tooth support girder or member 20 having the gear teeth 21 possessing a substantially elipticallike cross-sectional configuration, with the major axis thereof directed substantially radially with respect to the center of the track curve. Reference numeral 12 of FIG. 3 designates the parallel-teeth drive pinion meshing with the teeth 11 of the herein disclosed gear rack arrangement. The central portion 13 of this drive pinion 12, which in the curves of the track rolls upon the teeth 11 of the gear rack arrangement, can be formed of a different material than both of the outer portions 14 and 15 of this drive pinion 12. For instance, there can be used as the material for the central portion 13 of the drive pinion 12, for instance a synthetic material, plastic, nylon, and so forth, in order to therefore simultaneously achieve sound dampening effect. In the case of highly loaded suspended or overhead conveyor systems it can be necessary to form the central portion 13 from a harder and more wear-resistant material than the external portions 14 and 15 of the pinion 12.

In analogous manner, it is equally possible to use instead of truncated cones other teeth configurations. Thus, if as in the case of FIGS. 4 and 5, there is employed a pin or mangle gearing, wherein at the linear track portions the teeth of the gear rack arrangement are defined by cylindrical pins, then in a track curve these pins are replaced by pin members 17 possessing a spherical- or barrel-shaped pin configuration as best shown in these FIGS. 4, 5 and 7. The barrel-shaped pin configuration is illustrated by the pin members 17 of FIGS. 4 and 5, whereas the spherical-shaped pin configuration is illustrated by the pin members 27 of FIG. 7.

By virtue of the described configuration of the teeth of the gear rack arrangement it is now possible to obtain a faultless meshing between the drive pinion of the transport unit and the gear rack. In so doing, notwithstanding the theoretical point contact there need not be feared in any way overloading of the teeth since, during horizontal movement, practically only the frictional resistance need be overcome and, therefore, loading of the teeth is small. On the other hand, because of the occurring loads in the vertical track rails it is necessary to appropriately accommodate the design of the drive pinion and the width of the gear rack. Even if the engagement or meshing zone of the pinion should not be completely effective in the horizontal curves, then such can be easily compensated by providing a somewhat wider dimensioning of the outer portions 14 and 15 of the drive pinion 12.

By virtue of the described measures for designing and constructing the gear rack in the curved portions of the track conveying system it is now possible to construct overhead conveyors in which there can be attained a continuous rack and pinion drive independent of the course of the track rails.

While there is shown and described present preferred embodiment of the invention, it is to be distinctly understood that the invention is not limited thereto but may be otherwise variously embodied and practiced within the scope of the following claims.

Accordingly, What is claimed is:

1. A gear rack arrangement for the track of an overhead conveyor system having transport units moved through the agency of a gear rack and pinion drive, wherein the drive pinion of the transport unit meshes with the gear rack arrangement at the track, the improvement comprising the provision of teeth for such gear rack which reduce in their thickness radially inwardly and outwardly and form steadily curved surfaces at those track curves the plane of curvature of which is disposed substantially parallel to the plane of the gear rack.

2. A gear rack arrangement for the track of an overhead conveyor system having transport units moved through the agency of a gear rack and pinion drive, wherein the drive pinion of the transport unit meshes with the gear rack arranged at the track, the improvement comprising the provision of teeth for such gear rack which reduce in their thickness radially inwardly and outwardly at those track curves the plane of which is disposed substantially parallel to the plane of the gear rack, said teeth of the gear rack comprising truncated cones the respective lengthwise axis of which are each arranged substantially perpendicular to the plane of the track curve.

3. A gear rack arrangement as defined in claim 2, wherein each of said truncated cones possesses a substantially circular cross-sectional configuration.

4. A gear rack arrangement as defined in claim 2, wherein each of said truncated cones possesses a substantially ellipticallike cross-sectional configuration, wherein the major axis thereof is directed substantially radially with respect to the center of the track curve.

5. A gear rack arrangement as defined in claim 1, wherein said gear rack defines a pin gearing, the teeth of which possess a substantially barrellike configuration, with the lengthwise axis of each such tooth extending substantially parallel to the plane of the track curve.

6. A gear rack arrangement as defined in claim 1, wherein said gear rack defines pin gearing, the teeth of which each possess a substantially spherical configuration.

* * * * *